United States Patent
Poddar

(10) Patent No.: US 12,112,278 B2
(45) Date of Patent: Oct. 8, 2024

(54) SYSTEM AND METHOD FOR EVALUATING INTERVIEW RESPONSE QUALITY

(71) Applicant: Ashwarya Poddar, Kirkland, WA (US)

(72) Inventor: Ashwarya Poddar, Kirkland, WA (US)

( * ) Notice: Subject to any disclaimer, the term of this patent is extended or adjusted under 35 U.S.C. 154(b) by 275 days.

(21) Appl. No.: 17/579,421

(22) Filed: Jan. 19, 2022

(65) Prior Publication Data

US 2022/0230082 A1    Jul. 21, 2022

Related U.S. Application Data

(60) Provisional application No. 63/138,934, filed on Jan. 19, 2021.

(51) Int. Cl.
| | |
|---|---|
| *G06F 40/40* | (2020.01) |
| *G06F 40/205* | (2020.01) |
| *G06N 5/045* | (2023.01) |
| *G06Q 10/1053* | (2023.01) |
| *G10L 15/18* | (2013.01) |
| *G10L 15/26* | (2006.01) |

(52) U.S. Cl.
CPC .......... *G06N 5/045* (2013.01); *G06F 40/205* (2020.01); *G06F 40/40* (2020.01); *G06Q 10/1053* (2013.01); *G10L 15/1807* (2013.01); *G10L 15/26* (2013.01)

(58) Field of Classification Search
CPC ..... G06N 5/045; G06N 20/00; G06Q 10/1053
See application file for complete search history.

(56) References Cited

U.S. PATENT DOCUMENTS

| | | | |
|---|---|---|---|
| 2015/0269529 A1* | 9/2015 | Kyllonen | G06Q 10/1053 705/321 |
| 2017/0213190 A1* | 7/2017 | Hazan | G06F 16/951 |
| 2021/0233029 A1* | 7/2021 | Mittal | G06Q 10/1053 |
| 2021/0233031 A1* | 7/2021 | Preuss | G06F 3/011 |
| 2022/0076211 A1* | 3/2022 | Yoo | G06Q 10/0639 |

OTHER PUBLICATIONS

Naim et al. "Automated Analysis and Prediction of Job Interview Performance". IEEE Transactions on Affective Computing, vol. 9, No. 2, Apr.-Jun. 2018 (Year: 2018).*

* cited by examiner

*Primary Examiner* — Jesse S Pullias
(74) *Attorney, Agent, or Firm* — Plager Schack LLP; Mark H. Plager, Esq.; Stephen Hallberg, Esq.

(57) ABSTRACT

A system and method for analyzing a response to an interview questions is disclosed, including a speech recognition engine to receive audio information corresponding to a response to create a transcription of the response. A segmentation engine segments the transcription into one or more segments. A segment classification engine classifies the one or more segments into one or more functional units and group the functional units by at least one structure. A presentation skill KPI engine, a structure sequence KPI engine, and a content KPI engine to analyze the response and applying the analysis to a composite model to provide an overall rating of the response.

15 Claims, 3 Drawing Sheets

SYSTEM AND METHOD FOR EVALUATING INTERVIEW RESPONSE QUALITY

CROSS-REFERENCE TO RELATED APPLICATIONS

The present application claims priority to U.S. Provisional Patent Application No. 63/138,934 filed Jan. 19, 2021, entitled "SYSTEM AND METHOD FOR EVALUATING INTERVIEW RESPONSE QUALITY," which is hereby incorporated by reference in its entirety.

TECHNICAL FIELD

The embodiments generally relate to computerized systems for evaluating the content, structure, and presentation of an interview interaction.

BACKGROUND

Job seekers often practice their interview responses ahead of an anticipated interview. Applications directed towards interview preparation are available and provide the job seeker with a list of popular questions, which they may encounter during the interview process. These systems give the job seeker the opportunity to consider the content of their responses and a strategy for effectively answering the interview questions; however, these systems lack the ability to evaluate the content, structure, and presentation (i.e., the delivery) of the responses and provide adequate feedback to help the applicant improve their responses.

The STAR (situation, task, action, and result) interview structure has been widely practiced by candidates to prepare quality answers to many interview questions; however, the STAR structure is only a guideline for a potential response structure and does not evaluate the quality of or provide feedback on the responses themselves.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

The embodiments provided herein relate to a system and method for analyzing a response to an interview question, including a speech recognition engine to receive audio information corresponding to a response to create a transcription of the response. A segmentation engine segments the transcription into one or more segments. A segment classification engine classifies the one or more segments into one or more functional units and group the functional units by at least one structure. A presentation skill key performance indicator (KPI) engine, a structure sequence KPI engine, and a content KPI engine are included to analyze the response and apply the analysis to a composite model in order to provide an overall rating of the response.

The embodiments provide a useful evaluation of the interview response quality by analyzing the content, structure, and presentation of the user's response. The system may utilize the audio components of a computing device to capture the interview response presented by the user. The response is then transcribed by the system and analyzed using machine learning techniques to group and categorize segments of the transcription into a plurality of structures. Structured content is defined by a key performance index (KPI) such as the length of response, presence of specific duties, specific tasks, multiple actions, time spent in a segment of a structure, usage of specific words (e.g., "I" versus "we") when referring to actions, measurable results, sequence of segments within the structure, etc. The access to the analysis of the structure of the response significantly improves the accuracy of the content analysis.

Structures of the response may include known interview response structures, such as the STAR system, or other response structures which may aid in generating and delivering responses to questions as would not be feasible using only the STAR system.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
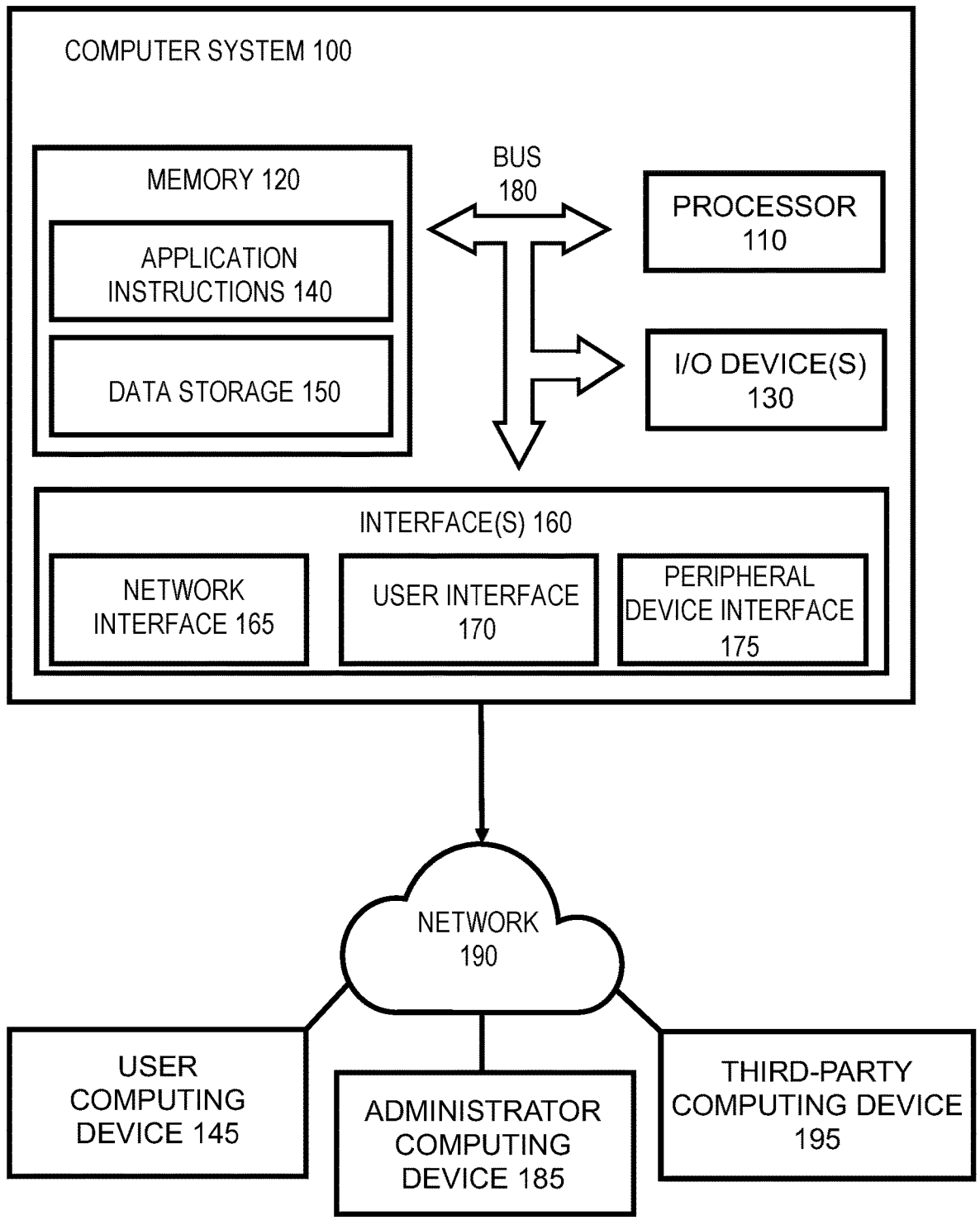
FIG. 1 illustrates a block diagram of a computing system, according to some embodiments.

The specific details of the single embodiment or variety of embodiments described herein are to the described system and methods of use. Any specific details of the embodiments are used for demonstration purposes only, and no unnecessary limitations or inferences are to be understood thereon.

Before describing in detail exemplary embodiments, it is noted that the embodiments reside primarily in combinations of components and procedures related to the system. Accordingly, the system components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this disclosure, the various embodiments may be a system, method, and/or computer program product at any possible technical detail level of integration. A computer program product can include, among other things, a computer-readable storage medium having computer-readable program instructions thereon for causing a processor to carry out aspects of the present disclosure.

As used herein, the term "user(s)" is used to describe a job seeker who is utilizing the functionalities of the system(s) and methods described herein; however, the user may not necessarily be a job seeker but may also be any individual preparing for an interview.

In general, the embodiments described herein relate to systems and methods for evaluating interview response quality by analyzing the content, structure, and presentation of the user's response. The system may utilize the audio components of a computing device to capture the interview response presented by the user. The response is then transcribed by the system and analyzed using machine learning techniques to group and categorize segments of the transcription into a plurality of structures. Structured content is defined by a key performance index (KPI) such as the length of response, presence of specific duties, specific tasks, multiple actions, time spent in a segment of a structure, usage of specific words (e.g., "I" versus "we") when referring to actions, measurable results, sequence of segments within the structure, etc. The access to the analysis of the structure of the response significantly improves the accuracy of the content analysis.

In some embodiments, the presentation skill KPI's may be analyzed, such as the speaking rate, use of filler words and the detection thereof, intonation, emotions, etc. Analyzing various KPI's provides a broad set of modeling features for the machine learning engine to accurately estimate the overall quality of the response. Further, the analysis and implementation of the machine learning models allows for the feedback of the response to be explained to the user and provides a means for indicating specific segments within a structure which need improvement.

FIG. 1 illustrates an example of a computer system 100 that may be utilized to execute various procedures, including the processes described herein. The computer system 100 comprises a standalone computer or mobile computing device, a mainframe computer system, a workstation, a network computer, a desktop computer, a laptop, or the like. The computing device 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions include both general and special purpose microprocessors and any one or more processors of any digital computing device. For example, each processor 110 may be a single processing unit or a number of processing units and may include single or multiple computing units or multiple processing cores. The processor(s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 150, configured to implement certain embodiments described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include, or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As used herein, the term "add-on" (or "plug-in") refers to computing instructions configured to extend the functionality of a computer program, where the add-on is developed specifically for the computer program. The term "add-on data" refers to data included with, generated by, or organized by an add-on. Computer programs can include computing instructions, or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In some embodiments, the computer system 100 may include a user (i.e., a patient, caretaker, etc.) computing device 145, an administrator computing device 185 and a third-party computing device 195 each in communication via the network 190. The user computing device 145 may be utilized by a patient or a caretaker to interact with the various functionalities of the system. The administrator computing device 185 is utilized by an administrative user to moderate content and to perform other administrative functions. The third-party computing device 195 may be in communication with third-party users who are permitted to receive and/or transmit patient information.

Figure 2:
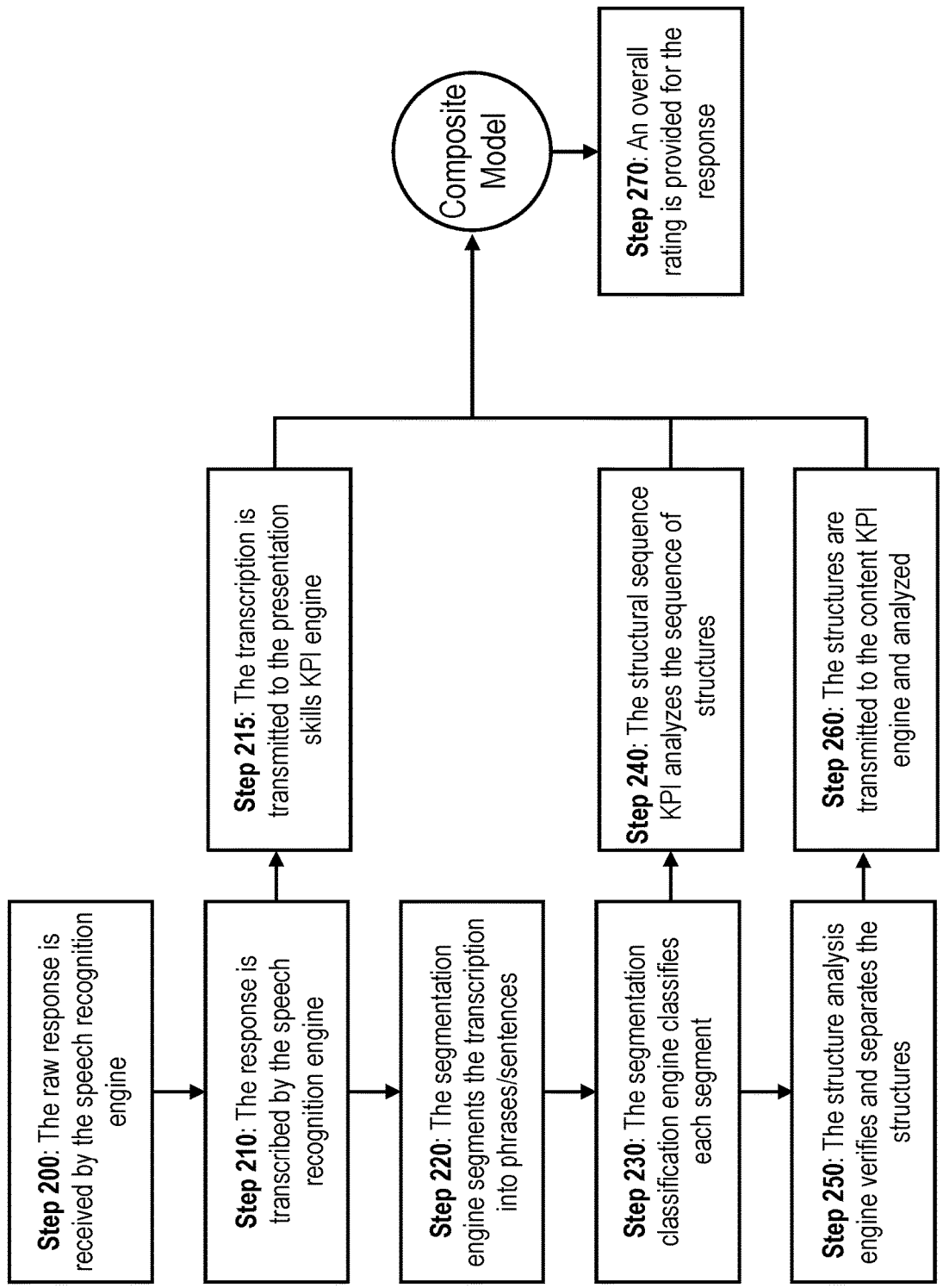
FIG. 2 illustrates a flowchart of the method for evaluating an interview response, according to some embodiments.

FIG. 2 illustrates a flowchart for a method of evaluating an interview response provided by the user. After the user is prompted with an interview question, in step 200 the system receives the raw response as audio data, which is captured from the user's spoken response. The response is captured by the audio components, and the audio information is provided to a speech recognition engine to be transcribed in step 210. The speech recognition engine both transcribes the audio information and provides timing information. In step 215, the transcription is transmitted to a presentation skills KPI engine wherein the speaking rate, intonation, emotion, and other presentation parameters are analyzed. A segmentation engine segments phrases and/or sentences within the transcription in step 220. A segment classification engine may then classify each of the segments into functional units in step 230. A structural sequence KPI engine may then analyze the sequence of structures (such as by determining if the STAR response strategy is presented in order) in step 240. In step 250, a structure analysis engine may then verify the structures, separate the structures, and transmit the structures to the content KPI engine in step 260. In step 270, an overall rating for the response is determined by the machine learning engine using the results of the presentation skills KPI engine, structural sequence KPI engine, and content KPI engine.

In some embodiments, and in further reference to FIG. 2, the system utilizes machine learning techniques to leverage and generalize actual data to determine the overall rating. The composite model functions as a classifier which uses all of the information from the raw response in step 200 above to produce the overall rating in step 270. In order to make the model useful to the user (i.e., to provide useful feedback and suggestions to the user submitting the response), the response is partitioned into two phases. The outputs of a first phase (steps 215, 240, and 260) serve both the input to the composite model classifier and the human readable constructive feedback and explanations.

In some embodiments, a composite model is created and applied on top of the analysis from each of the presentation skills KPI engine, structural sequence KPI engine, and content KPI engine to assess an overall rating.

In some embodiments, the segmentation classification engine utilizes deep learning models such that a plurality of separate models for each difference structure analysis may be trained with labeled responses. As input is provided into the deep learning model to retrieve the structure label (e.g., "situation" in STAR), and the structure labels are used to augment the phrases and/or sentences into functional units.

In some embodiments, the structure sequence KPI's may confirm whether the response follows the structure sequence requirements (e.g., is the response in the correct sequence of structures according to STAR or another response strategy). For example, the "situation" and "task" statements should be ahead of the "action" and "results" statements.

In some embodiments, content KPI's may be simple rules, such as a word count ratio threshold for the "situation" and "task" segment.

One skilled in the arts will readily understand that although the response structure and strategy STAR is used in the examples provided herein, other response strategies may be implemented. Notably, IDRPIM (introduction, duties, results, personality, interests and motivation) is another contemplated response strategy used to answer certain popular interview questions related to personal interview questions. In another example CPGI (culture, product, growth, and industry) may be utilized to assess the response of popular interview questions related to company research.

Figure 3:
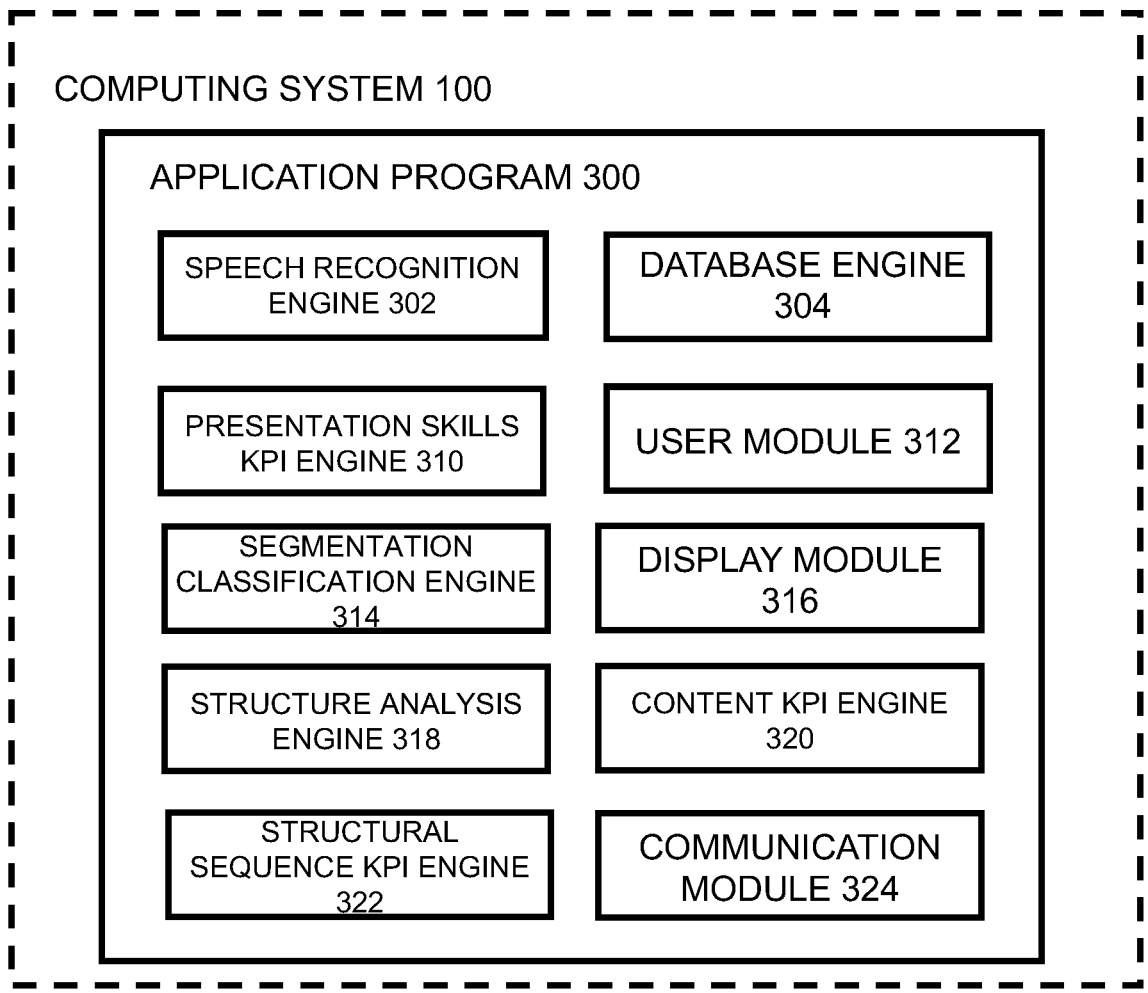
FIG. 3 illustrates a block diagram of a computing system and an application program, according to some embodiments.

FIG. 3 illustrates an example computer architecture for the application program 300 operated via the computing system 100. The computer system 100 comprises several modules and engines configured to execute the functionalities of the application program 300, and a database engine 304 configured to facilitate how data is stored and managed in one or more databases. In particular, FIG. 3 is a block diagram showing the modules and engines needed to perform specific tasks within the application program 200.

Referring to FIG. 3, the computing system 100 operating the application program 300 comprises one or more modules having the necessary routines and data structures for performing specific tasks, and one or more engines configured to determine how the platform manages and manipulates data. In some embodiments, the application program 300 comprises one or more of a speech recognition engine 302, a database engine 304, a presentation skills KPI engine 310, a user module 312, a segmentation classification engine 314, a display module 316, a structure analysis engine 318, a content KPI engine 320, a structural sequence KPI engine 322 and a communication module 324.

In some embodiments, a speech recognition engine 302 engine to receive audio information corresponding to a response to create a transcription of the response.

In some embodiments, a database engine 304 is configured to facilitate the storage, management, and retrieval of data to and from one or more storage mediums, such as the one or more internal databases described herein. In some embodiments, the database engine 304 is coupled to an external storage system. In some embodiments, the database engine 304 is configured to apply changes to one or more databases. In some embodiments, the database engine 304 comprises a search engine component for searching through thousands of data sources stored in different locations.

In some embodiments, the presentation skills KPI engine 310 analyzes the speaking rate, intonation, emotion, and other presentation parameters.

In some embodiments, the user module 312 facilitates the creation of a user account for the application system. The user module 312 may allow the user to create a user profile which includes user information, user preferences, establish user credentials, and the like.

In some embodiments, the segmentation classification engine 314 is in operable communication with the computing system to utilize deep learning models such that a plurality of separate models for each difference structure analysis may be trained with labeled responses.

In some embodiments, the display module 316 is configured to display one or more graphic user interfaces, including, e.g., one or more user interfaces, one or more consumer interfaces, one or more video presenter interfaces, etc. In some embodiments, the display module 316 is configured to temporarily generate and display various pieces of information in response to one or more commands or operations. The various pieces of information or data generated and displayed may be transiently generated and displayed, and the displayed content in the display module 316 may be refreshed and replaced with different content upon the receipt of different commands or operations in some embodiments. In such embodiments, the various pieces of information generated and displayed in a display module 316 may not be persistently stored.

In some embodiments, the structure analysis engine 318 verifies the structures, separate the structures, and transmit the structures to the content KPI engine 320.

In some embodiments, the content KPI engine 320 a composite model is created and applied on top of the analysis from each of the presentation skills KPI engine 310, structural sequence KPI engine 322, and content KPI engine 320 to assess an overall rating.

In some embodiments, a sequence KPI engine 322 analyzes the sequence of structures (such as by determining if the STAR response strategy is presented in order).

In some embodiments, the communication module 324 is configured for receiving, processing, and transmitting a user command and/or one or more data streams. In such embodiments, the communication module 302 performs communication functions between various devices, including the user computing device 145, the administrator computing device 185, and a third-party computing device 195. In some embodiments, the communication module 302 is configured to allow one or more users of the system, including a third-party, to communicate with one another. In some embodiments, the communications module 302 is configured to maintain one or more communication sessions with one or more servers, the administrative computing device 185, and/or one or more third-party computing device(s) 195.

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API allows programmers to use predefined functions to interact with an operating system, instead of writing them from scratch. Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrase "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

What is claimed is:

1. A method for analyzing a response to an interview question, the method comprising the steps of:
    capturing, by an audio component of a user computing device operated by a user, audio data of an audible response vocalized by a user;
    providing, by the user computing device, the audio data of the audible response vocalized by the user to a computer system;
    receiving, by a communication module of the computer system, the audio data provided by the user computing device, wherein the audio data comprises audio information corresponding to the response;

providing, by the communication module of the computer system, the audio information to a speech recognition engine of an application program running on the computer system, wherein the audio information comprises timing information corresponding to vocalized audio in the audible response vocalized by the user;

transcribing, by the speech recognition engine, the audio information to a transcription;

adding, by the speech recognition engine, the timing information to the transcription;

providing, by the speech recognition engine, the transcription to a presentation skills key performance index (KPI) engine of the application program running on the computer system;

performing a presentation skills analysis, by the presentation skills KPI engine, of the transcription;

identifying, by way of the presentation skills analysis performed by the presentation skills KPI engine, a plurality of response presentation parameters;

providing, by the speech recognition engine, the transcription to a segmentation engine of the application program running on the computer system, wherein the segmentation engine is configured to identify and segment phrases and sentences within the transcription;

segmenting, via the segmentation engine, the transcription into a plurality of segments;

classifying, via a segment classification engine of the application program running on the computer system, the plurality of segments into a plurality of functional units, wherein each segment in the plurality of segments is classified into a separate functional unit in the plurality of functional units;

grouping, by the segment classification engine via a machine learning engine, the plurality of functional units into a plurality of structures comprising a sequence of structures;

providing, by the segment classification engine, the sequence of structures to a structural sequence KPI engine of the application program running on the computer system;

performing a structural sequence analysis, by the structural sequence KPI engine, of the sequence of structures;

separating, by a structure analysis engine of the application program running on the computer system, the plurality of structures;

providing, by the structure analysis engine, the separated structures to a content KPI engine of the application program running on the computer system;

performing a content analysis, by the content KPI engine, of the separated structures; and applying, by the machine learning engine, the presentation skills analysis, the structural sequence analysis, and the content analysis to a composite model to provide an overall rating of the response.

2. The method of claim 1, wherein the sequence of structures are defined by an interview response strategy.

3. The method of claim 1, wherein the plurality of response presentation parameters comprises a speaking rate based on the timing information and a word count of the transcription, an intonation of the response, and an emotion expressed in the response, wherein the presentation skills KPI engine is further configured to analyze the transcription to detect the use of filler words in the response.

4. The method of claim 1, further comprising transmitting, by the communications module of the computer system, the overall rating of the response to the user computing device operated by the user, wherein a display module is configured to display the overall rating of the response in one or more graphical user interfaces.

5. The method of claim 1, wherein the segment classification engine utilizes one or more deep learning models of the machine learning engine to group the plurality of functional units into the plurality of structures, wherein the deep learning models for each different structure analysis are trained with one or more labeled responses.

6. The method of claim 1, further comprising:
verifying, by the structure analysis engine, the structures; and
transmitting the verified and separated structures to the content KPI engine.

7. The method of claim 1, further comprising assessing, by the content KPI engine, the overall rating of the response via the composite model.

8. A system for analyzing a response to an interview question, the system comprising:

a user computing device comprising an audio component that is configured to capture audio information corresponding to a response to an interview question, wherein the response is vocalized by a user operating the user computing device;

a computer system comprising (i) a communications module that is configured to receive the audio information from the user computing device and (ii) an application program that is configured to analyze the audio information corresponding to the response;

a speech recognition engine of the application program, wherein the speech recognition program is configured to receive the audio information corresponding to the response and to create a transcription of the response when the application program is running on the computer system;

a segmentation engine of the application program, wherein the segmentation engine is configured to segment the transcription into one or more segments when the application program is running on the computer system;

a segment classification engine of the application program, wherein the segment classification engine is configured to (i) classify the one or more segments into one or more functional units and (ii) group the functional units into a sequence of structures when the application program is running on the computer system;

a structure analysis engine of the application program, wherein the structure analysis engine is configured to separate the sequence of structures into separate structures when the application program is running on the computer system;

a plurality of key performance index (KPI) engines of the application program, wherein the plurality of KPI engines comprise a presentation skills KPI engine configured to perform a presentation skills analysis of the transcription after the speech recognition engine creates the transcription, a structural sequence KPI engine configured to perform a structural sequence analysis of a sequence of structures after the segment classification engine classifies the segments into functional units and groups the functional unit into the sequence of structures, and a content KPI engine configured to perform a content analysis of the structures when the application program is running on the computer system; and a machine learning engine of the application program, wherein the machine learning engine is configured to apply the presentation skills analysis, the structural sequence analysis, and the content analysis to a composite deep learning model to provide an overall rating of the response when the application program is running on the computer system.

9. The system of claim 8, wherein the structures are defined by an interview response strategy.

10. The system of claim 8, wherein the speech recognition engine provides timing information corresponding to the audio information.

11. The system of claim 8, wherein the presentation skills KPI engine is further configured to analyze the audio information corresponding to the response to identify a speaking rate, an intonation, and an emotion when the application program is running on the computer system.

12. The system of claim 8, further comprising a display module that is communicably connected to one of (i) the user computing device and (ii) the computer system, wherein the display module is configured to display one or more graphical user interfaces.

13. The system of claim 8, wherein the segmentation classification engine utilizes one or more deep learning models of the machine learning engine when the application program is running on the computer system, and wherein a plurality of separate models for each different structure analysis are trained by the machine learning engine with one or more labeled responses.

14. The system of claim 8, wherein the structure analysis engine is further configured to verify the structures and transmit the separated structures to the content KPI engine when the application program is running on the computer system.

15. The system of claim 8, wherein the content KPI engine is further configured to assess the overall rating of the response via the composite deep learning model when the application program is running on the computer system.

* * * * *